(No Model.)
G. R. CULLINGWORTH.
ROCK DRILL SUPPORT.
No. 287,102. Patented Oct. 23, 1883.
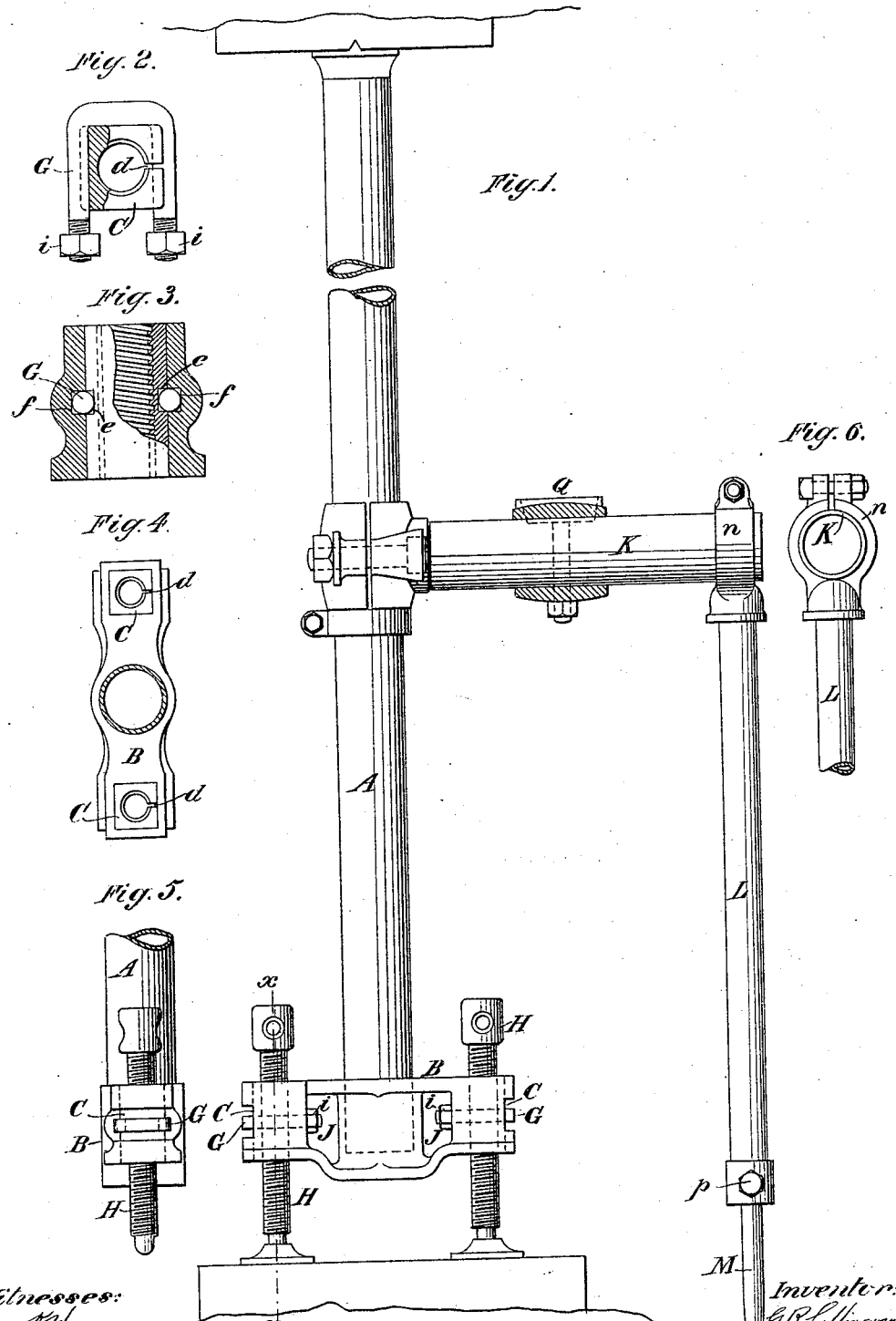

UNITED STATES PATENT OFFICE.

GEORGE R. CULLINGWORTH, OF NEW YORK, N. Y.

ROCK-DRILL SUPPORT.

SPECIFICATION forming part of Letters Patent No. 287,102, dated October 23, 1883.

Application filed February 21, 1883. (No model.)

*To all whom it may concern:*

Be it known that I, GEORGE R. CULLINGWORTH, of the city and county of New York, and State of New York, have invented certain new and useful Improvements in Rock-Drill Supports, of which the following is a specification, reference being had to the accompanying drawings.

My invention relates to that class of rock-drill supports in which the main vertical column is secured to a base or platform which is vertically adjustable by means of jack-screws working in nuts in the said base, and by which said column may be firmly pressed against the top of the tunnel and held firmly at the bottom of the tunnel.

My invention consists in a novel and effective means of providing for both securing the jack-screw nuts in the base and tightening up the said nuts upon their screws in case of their wearing loose.

In the accompanying drawings, Figure 1 represents an elevation of an apparatus embodying my invention. Fig. 2 is a detail representing a plan view of one of the vertically-adjustable nuts and the contrivance for holding the same within the base or platform. Fig. 3 is a vertical transverse section of the nut and the base through the line *x x* of Fig. 1. Fig. 4 is a plan of the base or platform with the jack-screws removed. Fig. 5 is an end view of the base or platform with its attachments. Fig. 6 is a front view of the lateral bar and vertically-adjustable leg-connection.

A represents the main vertical column, which may be secured to the base B at its lower end in the ordinary or any suitable manner. The base B is provided, near its ends, with vertical cavities or slots, in which are inserted the jack-screw nuts C. These nuts are split through on one side, as at *d*. Two opposite sides of the nuts are provided with grooves *e*, running transversely across them, and the cavities or holes in the base are each provided with corresponding grooves, *f*, upon the sides adjacent to the sides of the nuts having the grooves *e*. Each of the nuts C is fitted with a U-bolt, the legs of which pass through the grooves *e* and *f* in the nuts and in the base, the two corresponding grooves on each side of each of the nuts uniting to serve as a boltway for one of the legs of one of the U-bolts. Each of these bolts is thus made to keep its respective nut in place against the thrust of the jack-screw and the weight of the drill, and it is also made the means of tightening the nut on the screw H. The U-bolt G is provided at each of its ends with screw-threads and nuts *i*, which tighten the said bolt upon the nut C, which secure the bolt, so that it retains the nut in its place, and one of which serves to draw the divided portions of said nut together to tighten it upon the screw whenever necessary. The base B is provided with openings J, large enough to admit the nuts *i* and the end of a wrench, for screwing up said nuts.

In the above-described construction the nuts C, through which the jack-screws pass, are held very strongly and firmly, and said nuts are not liable to be injured, disturbed, or broken by the jarring motion of the drill. I provide a support at the outer end of the lateral arm K by a leg, L M. This leg is made telescopic in form, having an outside sleeve, L, and an inside rod, M. The upper end of the said sleeve is provided with a split collar, *n*, which encircles the outer end of the lateral arm K, and which is held firmly upon said arm by the screw-bolt *o*, connecting the split portion of said collar *n*. The rod M is adapted to slide up and down in the sleeve L, and to be adjusted and held firmly at any point by a set-screw, *p*, passing through the sleeve L, and its end pressing against the rod M. By means of the telescopic adjustment and the collar *n*, which may be slightly loosened for this purpose, the leg L M may be set either vertically or otherwise, to bring its lower end to the position best adapted to give proper support to the arm K and the drill.

What I claim as my invention, and desire to secure by Letters Patent, is—

In a rock-drill support, the combination, with the base, of the split jack-screw nuts and U-bolts passing through boltways formed partly in said nuts and partly in said base, substantially as shown and described, and serving both to secure the said split nuts in the base and to tighten the said nuts, as herein set forth.

G. R. CULLINGWORTH.

Witnesses:
FREDK. HAYNES,
ED. L. MORAN.